United States Patent [19]

French et al.

[11] 3,763,913

[45] Oct. 9, 1973

[54] TIRE HAVING KNIT BELT

[75] Inventors: Robert Williams French, Cuyahoga Falls; James Dennis Gardner, Akron, both of Ohio

[73] Assignee: The Firestone Tire & Rubber Company, Akron, Ohio

[22] Filed: Jan. 20, 1972

[21] Appl. No.: 219,434

[52] U.S. Cl. .............................. 152/361 R, 152/358
[51] Int. Cl. .............................................. B60c 9/18
[58] Field of Search .................. 152/358, 361, 330, 152/362 CS; 66/170, 171; 156/126

[56] References Cited
UNITED STATES PATENTS

| 2,947,340 | 8/1970 | French | 152/362 CS |
| 2,982,328 | 5/1961 | Emanueli et al. | 152/361 |
| 1,365,280 | 1/1921 | Sacks | 152/358 |
| 1,560,700 | 11/1925 | Langer | 152/358 |

FOREIGN PATENTS OR APPLICATIONS

| 1,295,187 | 4/1962 | France | 152/361 |

Primary Examiner—Gerald M. Forlenza
Assistant Examiner—George H. Libman
Attorney—S. M. Clark et al.

[57]  ABSTRACT

The invention relates to producing a cylindrically-built belted tire, the subsequent expansion of which extrudes columns of an adjoining rubber layer into a knit belt, whose loops during extension of the belt to its restrictive condition close and lock around the columns.

6 Claims, 8 Drawing Figures

PATENTED OCT 9 1973 3,763,913
SHEET 1 OF 2
FIG. 1
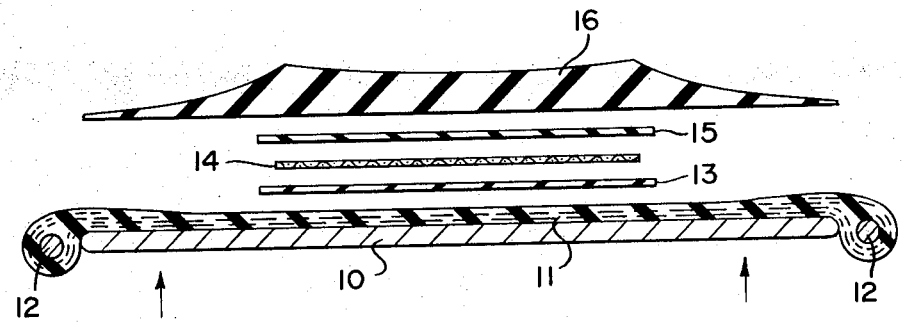
FIG. 2
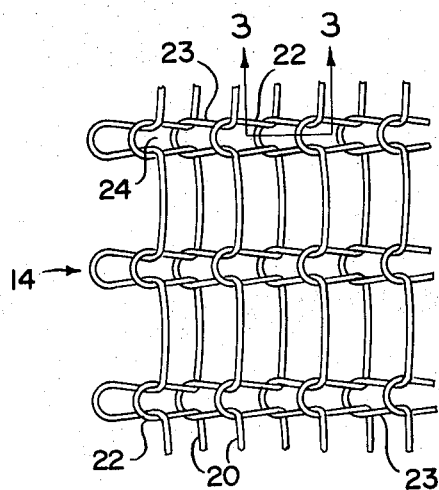
FIG. 3
FIG. 4
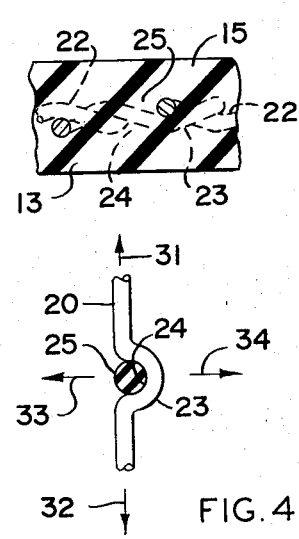
FIG. 5A
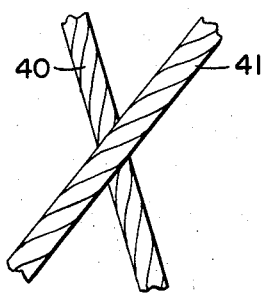
FIG. 5B
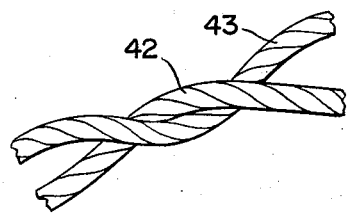

FIG. 6
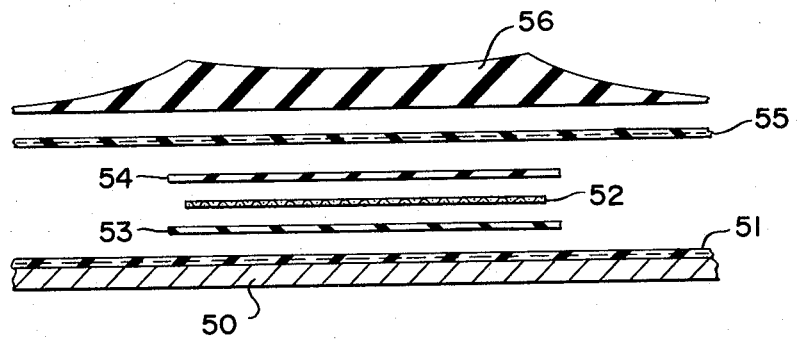
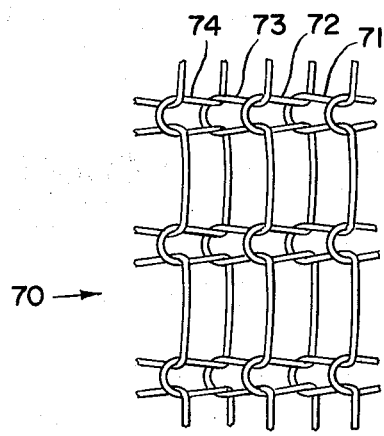
FIG. 7

TIRE HAVING KNIT BELT

BACKGROUND OF THE INVENTION

One widely-used type of passenger tire is the so-called belted type, in which the tire body, be it of biased cords or of radial cords, is reinforced under the tire tread by a structure whose cords extend predominantly circumferentially around the tire, or at least at such a high angle to the tire's rolling axis as to provide a degree of circumferential restriction of the tire.

Belts generally consist of rubberized fabric, such as textile, wire or glass, having parallel cords in each layer extending across the layer at an angle. Processing of this material, akin to that of processing tire body fabric, requires basically calenders or other rubber-coating devices with which to coat both fabric-faces; and cutting-, turning- and assembly-devices.

When separations occur in tires having conventional angled-cord belt structures, tread separations generally begin at the cut ends of the belt material and then proceed to produce an entire separation.

Prior art patents, such as Bragg U.S. Pat. No. 835,808, issued Nov. 13, 1906, and Sacks U.S. Pat. No. 1,365,280, have proposed knit testile as a medium for forming the entire tire body from bead to bead, and as a means of providing a pliable material easily formed over the top and along the sides of the toroidal tire-building cores of that day.

Resiliency and free-yielding of the tire tread area were the passwords of Bragg, who provided for a loose-knit fabric.

In Sacks, again, elasticity and stretchability matched to that of the rubber of the tire, are the goal, as well as ease in laying up a tire.

There is in neither patent above a question of utilizing a restrictive knit tread-belt and expanding an unvulcanized structure with it radially outwardly to a restricted diameter; or indeed, expansion of any type.

SUMMARY OF THE INVENTION

It is therefore an object of the invention to provide a tire, and method for building such tire, wherein a restrictive belt is placed under the tread having knit loops into which are extruded rubber columns which are enclosed and locked by closing of the knit loops, resulting in a uniformly-wearing tire circumferentially as well as laterally stabilized, and having a drastically reduced number of cut ends.

BRIEF DESCRIPTION OF THE DRAWINGS

FIG. 1 is an exploded diagrammtic view of the components of the tire in its unvulcanized state.

FIG. 2 is a plan view of a portion of the belt.

FIG. 3 is a sectional view, taken along line 3—3 of FIG. 2, including rubberization.

FIG. 4 is a plan view of a portion of the belt of FIG. 3.

FIG. 5A is a plan view of cords crossing in woven material.

FIG. 5B is a plan view of cabled cords in the knit belt.

FIG. 6 is an exploded diagrammatic view of the components of a modified form of a tire in its unvulcanized state.

FIG. 7 is a plan view of a portion of a modified form of belt.

DESCRIPTION OF PREFERRED EMBODIMENTS

Although numbered consecutively, such numbering is not determinative of relative utility of the embodiments.

With the present invention, a unique "strike through" is obtained such that tendency toward interface separation is reduced. The knit of the invention evidences, because of its mechanical structure, a high radial profile. Applicants take advantage of this during preparation of the tire by imbedding the knit physically, through radial outward expansion of the tire into the belt, in the adjoining rubber during shaping and vulcanization; this action extrudes columns of that rubber radially, particularly from the underlying face, through the plurality of loops in the knit.

At the same time, lengthening of the belt to the new circumference draws down the size of the loops, which close in and lock onto the entrapped, extruded rubber columns. It will thus be seen that a large number of 'strike-through' columns extend from the radially inner rubber layer, through the knit, to the radially outer rubber layer, resulting in a well-integrated structure resistant to separation. Once vulcanized, these circumscribed columns are in effect incompressible and are believed to aid in maintaining the tire restriction.

In the inflated tire, not only do these columns restrict circumferential extension of the tire, but the circumferential inflation loading simultaneously limits axial extension of the tire and thereby adds lateral rigidity in the belt area.

A necessary property of a tire is that cords crossing within the fabric material of the tire must not saw through each other where they cross, during cyclical loading; this has in the past eliminated from consideration the use of square-woven fabric. Uniquely, the knit structure of the invention provides a trouble-free cabling of the cords at the interstices, preventing saw-through.

The belt of the present invention requires no calendering equipment, and neither cutting, turning, or assembly machinery or manpower. The belt may thus be assembled without tying up valuable equipment required for producing other tire components. The belt is light-weight, evidencing typically a weight-saving over rayon-, glass-, and steel-bias belts which it replaced. The belt is easily manipulatable and exhibits, for example, neither the stiffness inherent in some rubber-coated cord fabric, nor the tendency of wire cord-ends to cut the adjacent rubberization.

Considerable work was done by applicants with a tire structure utilizing a knit endless wire belt material having only a "knit" configuration, or Jersey stitch, (as opposed to the opposite, or "purl"). In this form, its performance against tires having fiberglass belts gave promise, which prompted diversification to a belt having a combination of knit and purl. This configuration has a greater tendency to remain flat during handling and building. Combinations can be used in which any knit-pearl pattern proceeds a) circumferentially around the tire, b) laterally across the tire, or c) in combinations of a) and b).

Most belts were produced with continuous wire extending circumferentially of the tire, in a lateral knit-purl repeat, i.e., axially of the tire, to obtain a belt of limited, controllable circumferential extension, thus providing a pre-designable amount of restriction on the tire. This restriction feature is useful in tires having bias body plies; but it may also be utilized in radial body tires, by using combination-knits, or by a combination of knit belts with other stabilizing structure.

Alternatively, the belts may be produced having continuous wire extending laterally across the tire.

Instead of making a belt with a single continuous cord, resulting in a structure having only two cut ends, economy in time and manufacturing cost may be effected by knitting with f.ex. two or four cords, resulting in four and eight cut ends, respectively, still a vast improvement over the number of cut ends presented by bias-cut ply fabric.

I

FIG. 1 shows a cylindrical tire building drum 10 supporting a rubberized cord material tire body 11 anchored to inextensible beads 12. Additional first rubber thickness 13 is located on the tire body 11; this additional rubber may be either a separate member or an integral part of the rubberization covering the cord material, or in the form of increased overall cord rubberization gauge. An endless knit wire belt 14, further detailed in the following, is placed on top of the layer 13, and has a width in general close to that of the crown portion of the tire.

On top of belt 14 is located additional second rubber thickness 15; again, this may be in the form of a separate member, or integral with the overlying tread 16, or in the form of additional tread gauge.

The thicknesses 13 and 15 engage the opposite faces of the knit belt 14 in place of the calendering to which tire fabric usually is subjected.

If found convenient for ease in handling the structure, the assembled parts may be firmly engaged, either by causing the belt to contract onto the underlying rubber thickness, or by slightly expanding the diameter of the assembly radially, in the direction of the arrows.

Slight initial expansion may be done immediately after the belt 14 has been placed, or after a rubber thickness 15 is added, either separately or as a portion of the tread. Conveniently, it has been successfully done before thickness 15 is added.

The expansion may be effected either by expanding the drum segments radially; or by applying an expanding medium directly between drum and tire or to a resilient drum-cover.

With the tread 16 in place, the entire cylindrical assembly is removed from the building drum to a bladder-equipped tire press. In the press, internal pressure acting on a bladder shapes, or expands, it, and with it the tire, into toroidal form against the walls of a tire-mold. This extrudes the rubber columns through the belt-loops while drawing them down to encircle the columns. The belt is so designed in its loop-configuration, gauge, spacing, width and length as to insure that the controlled expansion during vulcanization results in optimum restrictive and stability properties of the finished tire.

An alternative construction method may utilize two-stage equipment, wherein an initial portion of a tire, typically comprising body ply material and beads, is assembled on a building drum, the assembly thereafter being expanded on a second machine to receive belt-structure and tread.

FIG. 2 shows a portion of the belt 14 of the invention, near one lateral edge, in the condition in which it is placed in the tire. The continuous cord 20 proceeds in loops 22 and 23 circumferentially about the tire, establishing sufficient "courses" of the fabric to provide the necessary belt width. The loops 22 which appear to extend toward the viewer are identified as 'knit,' while the alternate loops 23 which appear to extend away from the viewer are identified as 'purl.' The alternating loops 22 and 23 create a line of cabled interstices transversely across the tire. Within the loops 22 and 23 are the spaces 24 which close and lock about the rubber columns 25 hereinafter shown. The combination of 'knit' and 'purl' patterns may be varied to give optimum performance.

FIG. 3 shows portions of knit loops 22 and purl loops 23 of the belt 14, and the lower and upper rubber thicknesses 13 and 15, with one of the extruded rubber columns 25 encircled within space 24 of loop 23.

In FIG. 4 is shown an isolated circumferentially extending cord 20 of an inflated tire, which encircles a column 25 within the space 24 of its loop 23. Arrows 31 and 32 indicate the direction of tension on the cord 20 which, but for the presence of column 25, would tend to move loop 23 in the direction of arrow 33, i.e., axially of the tire tread. Since the tension at 31, 32 also keeps loop 23 from moving in the axial direction of arrow 34, the structure is stable laterally of the tire.

In FIG. 5A is shown the crossing of cords 40 and 41 in woven material, contributing to sawing-failure of the cords. FIG. 5B shows the improved cabling of cords 42 and 43 in the knit of the invention; this results in nondestructive rolling of the cords 42 and 43, rather than sawing.

A number of tires of the invention were produced in the F78–15 size, utilizing endless knit belts produced of 1 × 4 × 0.0069 inch brass-plated steel wire extending in circumferential courses and having a knit-purl pattern alternating across the belt width. The tire comprised two rayon bias body plies, the parallel cords of each of which crossed those of the other in conventional, balanced manner. Following their application to a cylindrical drum, a first rubbery layer, or insert, was placed on top of the body plies, followed by the endless knit belt. Prior to the application of a second rubber insert, the diameter of the assembly was increased slightly, and inextensible beads placed. After applying a second rubber insert and tread and sidewall and removing the finished assembly from the building drum, complete expansion was undertaken to extrude the rubber into the belt loops while extending the length of the belt and closing the knit loops around the extruded rubber; vulcanization followed.

Tires produced according to the above were subjected to vigorous testing, both on laboratory machinery and on the road, against control rayon bias tires having bias rayon belts.

Durability and high speed laboratory performance was equivalent to that of current production tires.

Tire uniformity grading showed an increase of more than 10 percent over regular production in the number of tires falling within the highest classification.

Marked improvement was noted during road-testing. Front tires are notoriously susceptible to uneven wear of the laterally outer tread-ribs, but the tires of the invention showed a conspicuous absence of uneven wear, demonstrating the improved lateral rigidity of the tread. Additionally, after 20,000 miles of road-testing, tread-wear improvement averaged better than 40 percent over the control tires. The diameters of the test tires showed less growth than did the control tires.

Driver opinions, again in comparison with the rayon-belt tires, rated the invention tires to be equal-to-better in riding quality and handling characteristics.

II

FIG. 6 shows drum 50 supporting another embodiment in which the belt 52, with its facing rubber layers 53 and 54, is located between body portions 51 and 55, before the tread 56 is placed.

III

FIG. 7 shows another embodiment in a knit belt 70, wherein circumferential courses 71 and 73 comprise wire or other substantially inextensible material, while other courses 72 and 74 comprise thin cord, such as cotton, which is easily broken during the expansion of the tire. As the tire is expanded or shaped, breaking the thin cords, there is created a restricting member having, in effect, a single continuous cord wrapped circumferentially around the tire.

What is claimed is:

1. In a pneumatic tire having a body edged with rim-engaging bead portions and carrying a road-engaging tread, the improvement comprising a circumferential, knit belt structure located radially inwardly of said tread and extending laterally thereof, said belt comprising substantially inextensible material expanded into restraining condition with its courses extending circumferentially and the loops thereof in lateral and circumferential locking engagement with the rubber of the tire.

2. The tire of claim 1, wherein said belt is endless circumferentially of the tire.

3. The tire of claim 1, wherein the loops of the courses of said belt extend uniformly in a knit-direction.

4. The tire of claim 1, wherein the loops of the courses of said belt extend uniformly in a purl-direction.

5. In tire of claim 1, wherein the loops of the courses of said belt extend selectively in knit and purl directions.

6. In an unvulcanized, substantially cylindrical tire preparation having rubberized tire body material anchored to beads, an encircling tread, and a belt radially inwardly of the tread, the improvement comprising said belt being knit and comprising a first course of substantially inextensible material, and a second course of material fracturable during subsequent expansion of the tire.

* * * * *